United States Patent
Hoehn et al.

(10) Patent No.: US 9,706,870 B2
(45) Date of Patent: Jul. 18, 2017

(54) COOKING APPLIANCE

(71) Applicant: Miele & Cie. KG, Guetersloh (DE)

(72) Inventors: Ruediger Hoehn, Hiddenhausen (DE); Alexander Schnee, Buende (DE); Christian Schulze, Enger (DE); Carolin Kaudewitz, Rheda-Wiedenbrueck (DE)

(73) Assignee: MIELE & CIE. KG, Guetersloh (DE)

( * ) Notice: Subject to any disclaimer, the term of this patent is extended or adjusted under 35 U.S.C. 154(b) by 0 days.

(21) Appl. No.: 14/835,792

(22) Filed: Aug. 26, 2015

(65) Prior Publication Data

US 2016/0058232 A1 Mar. 3, 2016

(30) Foreign Application Priority Data

Aug. 28, 2014 (DE) .................. 10 2014 112 352

(51) Int. Cl.
 *A47J 27/04* (2006.01)
 *F24C 15/32* (2006.01)
 *H05B 6/64* (2006.01)

(52) U.S. Cl.
 CPC .............. *A47J 27/04* (2013.01); *F24C 15/327* (2013.01); *H05B 6/6426* (2013.01); *H05B 6/6479* (2013.01); *A47J 2027/043* (2013.01)

(58) Field of Classification Search
 CPC ... A47J 27/04; A47J 2027/043; H05B 6/6426; H05B 6/6479
 USPC .......... 99/275, 279, 285, 324, 357; 219/625, 219/682, 687
 See application file for complete search history.

(56) References Cited

U.S. PATENT DOCUMENTS

| | | | |
|---|---|---|---|
| 2005/0230343 A1* | 10/2005 | Huber ................. | A47J 31/404 215/387 |
| 2006/0191915 A1* | 8/2006 | Kanzaki ................ | F24C 15/003 219/682 |
| 2006/0249136 A1 | 11/2006 | Reay | |
| 2011/0215091 A1* | 9/2011 | Stanger ................ | H05B 6/6479 219/682 |
| 2014/0109667 A1* | 4/2014 | White ................. | A47J 31/4457 73/304 C |

FOREIGN PATENT DOCUMENTS

| | | |
|---|---|---|
| DE | 19960743 A1 | 6/2001 |
| DE | 102010002853 A1 | 9/2011 |
| DE | 102011088454 A1 | 6/2013 |
| DE | 102011088482 A1 | 6/2013 |
| DE | 102012222029 A1 * | 6/2014 ............ F24C 15/327 |
| EP | 1610063 A1 | 12/2005 |

(Continued)

*Primary Examiner* — Thien S Tran

(74) *Attorney, Agent, or Firm* — Leydig, Voit & Mayer, Ltd.

(57) ABSTRACT

A cooking appliance includes a housing unit, a cooking chamber, a steam generation unit for supplying the cooking chamber with steam, a removable container unit associated with the steam generation unit. The removable container unit includes a container portion and a holding portion. The container portion and the holding portion together have a longitudinal extent that is a multiple of a width of the container portion. The container portion has a height that is a multiple of the width of the container portion. The container portion provides a capacity for water to be evaporated that is at least 1 liter.

14 Claims, 3 Drawing Sheets

(56) References Cited

FOREIGN PATENT DOCUMENTS

| | | | |
|---|---|---|---|
| EP | 1862099 A2 | | 12/2007 |
| JP | 2005155998 A | * | 6/2005 |
| JP | 2006132936 A | | 5/2006 |
| JP | 2008025895 A | | 2/2008 |
| WO | WO 2013003891 A1 | | 1/2013 |

* cited by examiner

COOKING APPLIANCE

CROSS-REFERENCE TO PRIOR APPLICATION

Priority is claimed to German Patent Application No. DE 10 2014 112 352.2, filed on Aug. 28, 2014, the entire disclosure of which is hereby incorporated by reference herein.

FIELD

The present invention relates to a cooking appliance with at least one housing unit, at least one cooking chamber and at least one steam generation unit. In this case, the steam generation unit is suitable and configured to supply the cooking chamber with steam. Furthermore, at least one removable container unit, which comprises at least one container portion and at least one holding portion, is associated with the steam generation unit.

BACKGROUND

Cooking appliances with a steam generator, in particular steam cookers, provide a user with the possibility of preparing the cooking product in a particularly gentle manner by means of steam. A plurality of methods for steam generation has become known to provide steam in the cooking chamber.

During internal steam generation, water is introduced into the cooking chamber and heated on an evaporation surface, generally on the cooking chamber base, and evaporated. External steam generators, on the other hand, produce steam outside the cooking chamber and do not introduce any water, but only steam, into the cooking chamber.

Water has to be fed to the steam generator or the respective evaporation surface depending on need in both types of steam generation. Inter alia a fixed water connection on the cooking appliance is suitable for this purpose, which connection can supply the steam generator with water at all times, according to need. However, it is not always possible to produce a fixed water connection, and in addition said connection is not always desired.

Furthermore, cooking appliances are known which comprise a removable water tank for the steam generator. Water for steam generation can be stored in a water tank of this type. In this case, a water tank of this type should ideally be able to receive so much water that at least one complete cooking process can be carried out with the stored water quantity. Otherwise, the user would have to refill water during the cooking process, which can impair the operating convenience and, in the worst case, even the efficiency and/or the cooking result.

A disadvantage of a sufficiently large water tank, however, is that said tank can be provided on the cooking appliance only with great difficulty in structural terms, meaning that it is difficult to adhere to predetermined external dimensions of the cooking appliance and/or of the cooking chamber.

SUMMARY

A cooking appliance includes a housing unit, a cooking chamber, a steam generation unit for supplying the cooking chamber with steam, a removable container unit associated with the steam generation unit. The removable container unit includes a container portion and a holding portion. The container portion and the holding portion together have a longitudinal extent that is a multiple of a width of the container portion. The container portion has a height that is a multiple of the width of the container portion. The container portion provides a capacity for water to be evaporated that is at least 1 liter.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
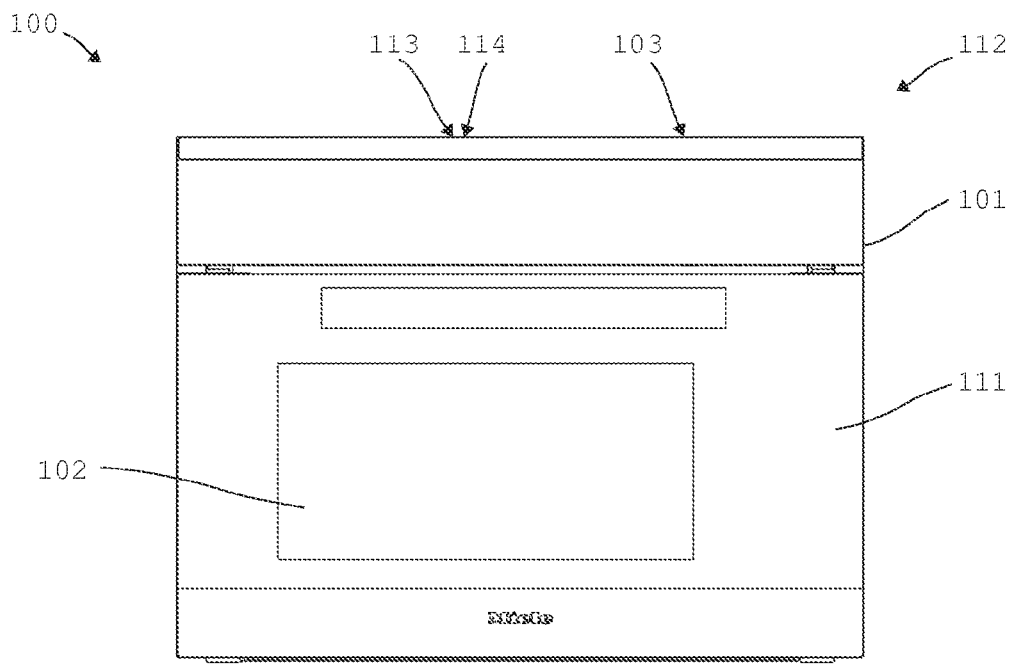
FIG. 1 is a purely schematic front view of a cooking appliance according to the invention.

The cooking appliance according to the invention comprises at least one housing unit, at least one cooking chamber and at least one steam generation unit. The steam generation unit is suitable and configured to supply the cooking chamber with steam, and at least one removable container unit, which has at least one container portion and at least one holding portion, is associated with the steam generation unit. In this case, the container portion and the holding portion together have a longitudinal extent, which is a multiple of the width of the container portion. In addition, at least the container portion has a height, which is a multiple of the width of the container portion. Furthermore, the container portion provides a capacity for water to be evaporated which is at least one liter.

According to the invention, the container portion is configured to be open at the top, in particular at least in portions, such that the container portion can be filled with water and such that appropriate means can be introduced into the container in order to remove the water from the container portion and supply said water to the steam generation unit. In other expedient developments, however, the container portion may also be configured so as to be substantially closed at the top. Then, a valve of some kind can preferably be provided at the bottom of the container portion for the purpose of removing water.

According to the invention, the holding portion in particular comprises a handle and is used for grasping the container unit. The container unit can thus be removed from the cooking appliance and filled with water.

The container portion and the holding portion are preferably configured so as to be substantially of the same height and width.

According to the invention, a multiple means, in particular, that the corresponding extent is at least three times the size of the comparative extent.

The cooking appliance according to the invention has many advantages. One substantial advantage is that a cooking appliance with a steam generation unit is provided, which comprises a container unit which has particularly narrow dimensions and yet still provides an adequate water volume.

This is achieved in that the dimensions of the container unit are provided such that said container unit has a relatively large longitudinal extent and height, but is configured so as to be relatively narrow. It is thus possible, for example, for the water tank for the steam generation unit, made available by the container unit, to be provided laterally next to the cooking chamber, without changing or without substantially changing the external dimensions of the cooking appliance and without substantially reducing the space available in the cooking chamber.

In addition, inter alia the container unit can also be provided without any additional cover since, when the cooking chamber door is closed, the container unit is concealed in a visually appealing manner by said door.

Preferably, the longitudinal extent of the container portion and of the holding portion and/or the height of the container portion is at least four times the size of the width of the container portion. In this case, it is particularly preferred for the corresponding extents to be at least five times the size of the width of the container portion. The greater the ratio of the longitudinal extent and height to the width of the container unit, the narrower it is possible to provide the container unit, without falling below a predetermined capacity for water to be evaporated.

Particularly preferably, the longitudinal extent of the container portion and of the holding portion combined is greater than the height of the container portion. As a result, the container unit is configured so as to be longer or deeper overall than it is high. Thus, depending on the configuration, it is possible to take advantage of the not insignificant depth of the cooking appliance in order to provide, in the container portion of the container unit, an adequate capacity for water to be evaporated.

In particularly advantageous developments, the capacity is at least 1.3 liters. Particularly preferably in this case, the capacity is at least 1.5 liters. In particular in the case of an embodiment having a capacity of 1.5 liters, it can generally be ensured that a complete cooking process can be carried out using steam, without water having to be refilled in the meantime. This would reduce the convenience for a user and would in addition, in some circumstances adversely affect the cooking result and the efficiency of the cooking appliance. It is generally preferred for the capacity to be adapted to the size of the cooking chamber, such that sufficient water storage for a complete cooking process is provided.

The width of the container portion is preferably of between 3 cm and 5 cm. In this case, the width of the holding portion preferably corresponds at least approximately to the width of the container portion.

Preferably, the height of the container portion is of between 15 cm and 25 cm and/or the longitudinal extent of the container portion is of between 20 cm and 30 cm and/or the longitudinal extent of the container portion and the holding portion combined is of between 25 and 35 cm. Embodiments of this kind have expediently been proven to provide an advantageously configured receiving container.

Particularly preferably, at least one cover is assigned in the container portion. Said cover may be formed in particular as a lid, which is preferably configured so as to be removable.

In expedient developments, the cover comprises at least one opening. In this case, in particular an opening is provided for filling the container portion with water. In addition, in advantageous embodiments, means for removing water can be inserted into an opening of this kind, via which means water is supplied to the steam generation unit for evaporation. The opening is particularly preferably elongate and is configured in particular as a slot.

In expedient embodiments, the cover is associated with at least one protective means. A protective means of this kind is preferably configured as what is referred to as anti-sloshing protection, the protective means preventing water from being able to escape from the opening in the cover during transportation of the container unit. The protective means is configured in this case in particular as a type of collar, which extends downwards into the container portion at least in portions. The protective means is preferably provided on the upper edge of the container portion or particularly preferably on the cover as well. Then, the protective means is associated in particular with the opening of the cover. In this case, the protective means is preferably configured in such a way that it is possible to fill the container portion with water in a simple manner. However, the protective means prevents water from being able to slosh out of the container unit, during transportation thereof, from a water source to the cooking appliance after said container unit has been filled.

The cover particularly preferably encompasses at least two walls at least of the container portion. This results in the cover or the lid stabilising the container unit. By encompassing the two walls, the cover can fix the two walls in a specific position in relation to one another. The walls of the container portion can thus be provided having a smaller thickness for example, without the container portion deforming or breaking when being filled with water.

In expedient embodiments, the holding portion comprises at least one operating marking. A marking of this kind is advantageous in particular when a mechanism for removing the container unit is provided on the cooking appliance. The operating marking then indicates to the user an optimum force point for triggering the mechanism.

The container unit can be inserted into a corresponding receiving unit next to the cooking chamber. A receiving unit of this type is in particular an insertion compartment adapted to the container unit, into which the container unit can be easily inserted. In this case, said corresponding receiving unit is in particular substantially precisely matched to the container unit. Since the container unit is configured so as to be particularly narrow but also high and long, it is possible for an adequate capacity to be arranged next to the cooking chamber.

The container unit, in the installed state, particularly preferably terminates substantially flush with at least one front face of the housing unit. In this case, the container unit terminates in particular such that the surfaces are substantially flush with the front face. Here, the installed state means the operating state, in which the container unit is completely inserted in the cooking appliance and in which, depending on the embodiment, for example a suction pipe for removing water from the container is immersed therein. Since the container unit is received in the receiving unit in a manner in which the surfaces are flush, a user is prevented from reaching between the container unit and the receiving unit and easily removing the container unit.

More preferably, at least one push-to-open mechanism is associated with the receiving unit. Said push-to-open mechanism makes it possible for the container unit to be substantially completely inserted into the cooking appliance against a spring force of a spring means. When the container unit is inserted, the spring means of the push-to-open mechanism is then fixed in the preloaded position. In order to remove the container unit, the container is then again pushed a little way into the cooking appliance, triggering the push-to-open mechanism and releasing the stored spring force. As a result, the container unit is pushed out of the cooking appliance at least a little way, meaning that a user can easily grasp it. In this case, the push-to-open mechanism may be associated with the receiving unit, i.e. the cooking appliance, or even with the container unit.

The steam generation unit particularly preferably comprises at least one removal device, which comprises at least one pivotable tube. This tube is immersed in the container portion, at least in portions, during insertion of the container unit into the receiving unit. In this case, the tube is preferably automatically immersed during the insertion of the container unit and is also automatically pivoted out of the container unit again when the container unit is removed from the cooking appliance. For this purpose, the tube may comprise a spring means which automatically moves the tube a specific position. The tube is preferably provided above the container unit and is preferably in an approximately horizontal position before insertion of the container unit. On insertion of the container unit, the tube is automatically displaced into an approximately vertical position in order to remove water from the container portion.

In expedient developments, at least one microwave unit is associated with the cooking chamber, which microwave unit comprises at least one high-frequency generator which is suitable and configured to introduce high-frequency radiation into the cooking chamber at at least one inlet point. By means of a configuration of this type, a combined appliance can be provided, with which food in the cooking chamber can be cooked in steam operation, microwave operation, or combined operation.

FIG. 1 purely schematically shows a cooking appliance 100 according to the invention in a front view. In this case, the cooking appliance 100 comprises a housing unit 101, in which a cooking chamber 102 is configured. The cooking chamber 102 is closed here by a cooking chamber door 111 in FIG. 1. The cooking appliance 100 further comprises a steam generation unit 103, which is suitable and configured to supply the cooking chamber 102 with steam 104.

The cooking appliance 100 shown is configured here as a combined cooking appliance 112, a microwave unit 113, which comprises a high-frequency generator 114, being additionally associated with the cooking chamber 102 in addition to the steam generation unit 103. In this case, the high-frequency generator 114 is suitable and configured to introduce high-frequency radiation 115 into the cooking chamber 102, at least at one inlet point 116.

Figure 2:
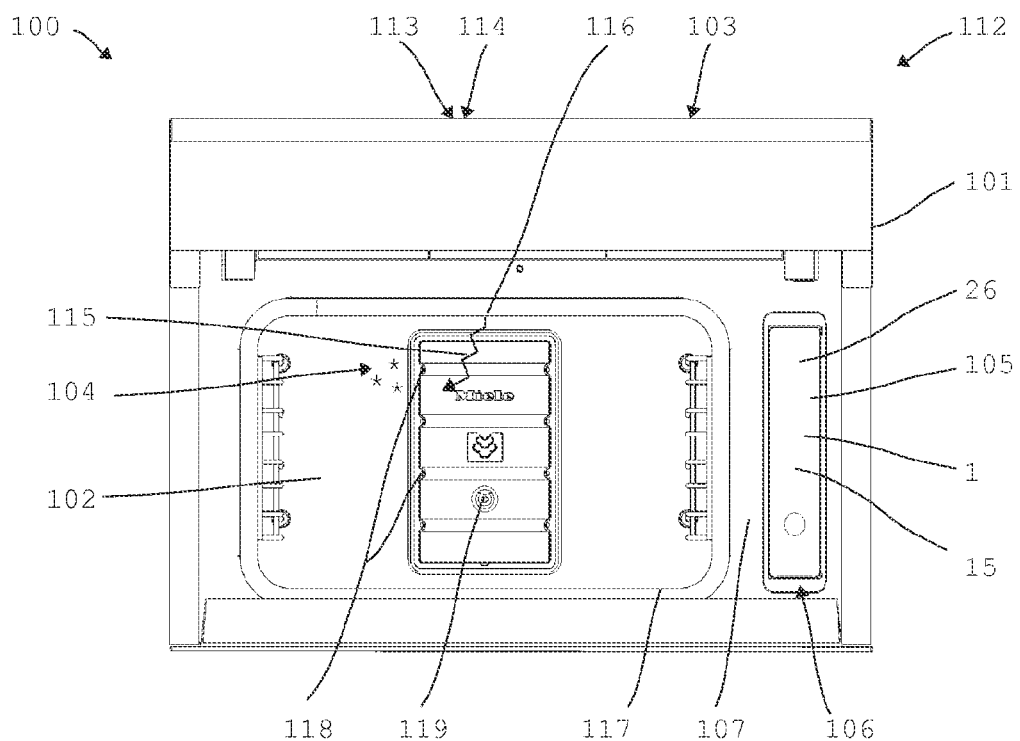
FIG. 2 shows the cooking appliance according to FIG. 1 without a cooking chamber door.

FIG. 2 shows the cooking appliance 100 according to FIG. 1, the cooking chamber door 111 not being shown in this view. In this case, the view through the feed opening 117 is into the cooking chamber 102. Various steam inlets 118, by means of which the steam 104 can be guided into the cooking chamber 102, are provided in the cooking chamber 102. In addition, the cooking chamber 102 comprises a steam outlet 119, by means of which excess steam 104 can be removed from the cooking chamber 102.

According to the invention, the steam generation unit 103 of the cooking appliance 100 comprises a water storage means 105 which, in the embodiment shown here, is configured as a container unit 1. The container unit 1 is provided here in a correspondingly configured receiving unit 106 in the housing unit 101 of the cooking appliance 100 next to the cooking chamber 102. In this case, the receiving unit 106 is configured and adapted to the container unit 1 in such a way that the container unit 1 can be substantially completely received in the receiving unit 106.

Thus, the front 26 of the container unit 1, together with the front face 107 of the housing unit 101, forms a substantially flush face. In this case, the container unit 1 and the front face 107 are substantially provided with the surfaces flush. This, in particular prevents a user attempting to reach between the handle 25 and the receiving unit 106 when the container unit 1 is inserted and pulling said container unit out. The container unit 1 should namely be removed by means of a push-to-open mechanism to be described in more detail below.

The arrangement of the container unit 1 next to the cooking chamber 102 is possible owing to the special configuration of the container unit 1. In this case, the container unit 1, owing to the special dimensioning of the container unit 1, can be received next to the cooking chamber 102 without the size of the cooking chamber having to be restricted, or substantially restricted, or else increasing the external dimensions of the cooking appliance, or substantially increasing them. The special dimensioning and configuration of the container unit 1 is shown in more detail in the following figures.

Figure 3:
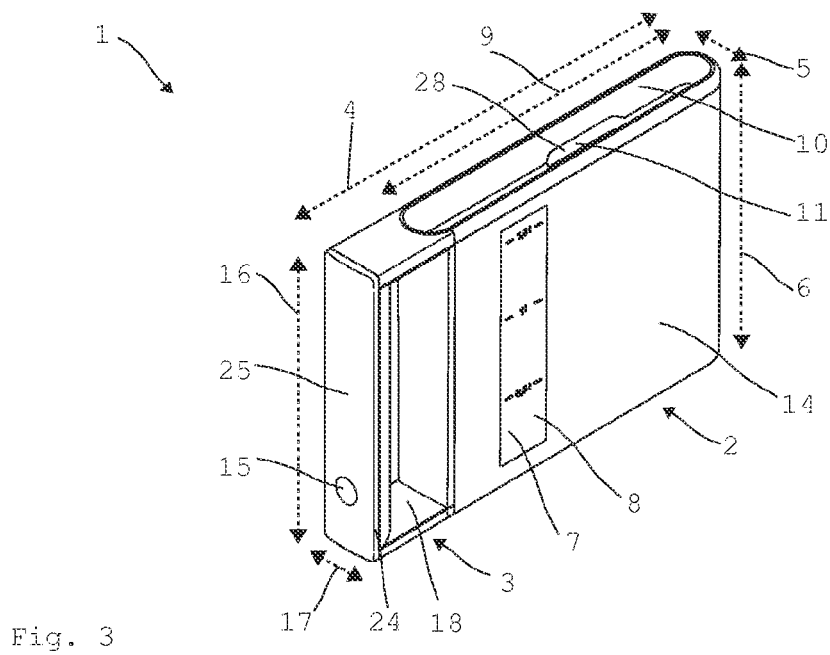
FIG. 3 is a purely schematic perspective view of a container unit.

FIG. 3 shows the container unit 1 in a purely schematic perspective view. In this case, the container unit 1 comprises a container portion 2 and a holding portion 3. The container portion 2 provides a capacity 7 for water 8. The holding portion 3 comprises a handle 25, which allows a user to hold the container unit 1 safely and conveniently despite the special dimensions.

The container portion 2 and the holding portion 3 together have a longitudinal extent 4, which makes up a multiple of the width 5 of the container portion 2. In addition, the height 6 of the container portion 2 is greater by a multiple than the width 5 of the container portion 2. In this case, the height 6 of the container portion 2 corresponds to the height 16 of the holding portion 3.

The container unit 1 or the container portion 2 is dimensioned and configured in such a way that the container portion 2 provides a capacity 7 for water 8 that is to be evaporated, which is at least 1 liter. In this case, the capacity 7 for water 8, in the embodiment shown here, is selected to be so great that 1.5 liters can be received.

The capacity 7 is in this case adapted to the size of the cooking chamber 102 and selected such that a complete cooking process can be carried out in the steam operation with one filling of the container unit 1. Thus a user does not have to open the cooking chamber door 111 during a cooking process in order to refill water 8 into the container unit 1. This would restrict the operating convenience of the cooking appliance 100 and additionally impair the effectiveness of the cooking appliance 100, as a not insubstantial proportion of steam 104 would escape from the cooking chamber by opening the cooking chamber door 111.

It can in general be achieved by the container unit 1 that an adequate capacity 7 is provided for water 8 that is to be evaporated, the container unit being provided to be as narrow as possible. It can thus be arranged in a space-saving manner next to the cooking chamber 102. In this case, the width 5 of the container portion 2 is preferably between 3 cm and 5 cm. The width 5 is a good 4 cm in the embodiment shown here.

In order to be able to grasp the container unit 1 easily, an aperture 18 is provided between the holding portion 3 and the container portion 2, a user being able to insert his hand through said aperture. This makes it possible for a user to be able to safely clasp the handle 25 of the holding portion 3. Thus, despite the special dimensioning of the container unit 1, the user can safely and nevertheless conveniently remove the container unit 1 from the cooking appliance 100 and transport it, for example, to a sink.

The embodiment shown of the container unit 1 has a longitudinal extent 4 of the container portion 2 and holding portion 3 of 31.1 cm. In this case, 25.6 cm thereof are allotted to the longitudinal extent 9 of the container portion. The container unit 1 also has a height of 21.2 cm. The width 5 of the container portion 2 corresponds to the width 17 of the holding portion 3, a width of 4.4 cm being selected. In other configurations, other dimensions may expediently also be provided, as are defined inter alia in the claims.

However, it is generally preferred for the container unit 1 to be higher by a multiple and deeper by a multiple than the width of the container unit 1. A multiple is, in particular, to be taken to mean here that the container unit 1 is at least three times, four times, five times or even higher and/or deeper than wide.

A marking 15, which indicates to a user a suitable force point for removing the container unit 1, is provided on the holding portion 2 or on the front 26 of the holding portion 3. As will still be described in FIGS. 7 and 8, a user is assisted in removing the container unit 1 from the removal device 106 by a push-to-open mechanism 108.

The container unit 1 in addition, in the embodiment shown here, comprises a cover 10. This cover 10 is configured as a lid 27, which has at least one opening 11 in this configuration.

Figure 4:
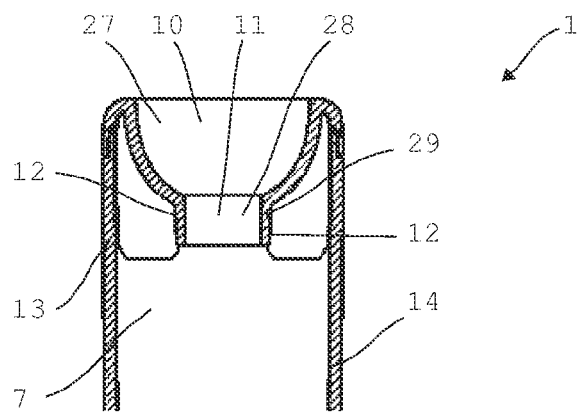
FIG. 4 is a purely schematic sectional view through a container unit.

A purely schematic sectional view through a container unit 1 is shown in more detail in FIG. 4. It can be seen here that the cover 10 is configured in such a way that it can be placed on the container portion 2. In this case, the cover 10 encompasses the two walls 13 and 14 of the container unit 1, at least in portions.

As a result, an additional stabilisation of the container portion 2 is made possible, as the cover 10 fixes the two walls 13 and 14 in a specific position in relation to one another. Thus, it is also possible, in particular, for the thickness of the walls 13, 14 to be made very small, without of the container unit 1 becoming unstable.

The opening 11 in the cover 10 is used, in particular, to fill the container portion 2 with water 8. In this case, for example, water 8 can be refilled into the container portion 2 from a water tap via this opening 11. In addition, a tube 110 can be pivoted through this opening 11 into the container portion 2. Water 8 can also be removed from the receiving portion 2 by this tube 110 in order to feed the water to the steam generation unit 103 for evaporation. For this purpose, the opening 11 in the cover 10 is, in particular, elongate and is provided here by a slot 28.

So that no water 8 can be spilt during transportation of the filled container unit 1 from a water source to the cooking appliance 100, a protective device 12 is associated with the container portion 2. In this case, the protective device 12 is provided on the cover 10 in the embodiment shown here. In this case, the cover 10 is shaped in such a way that the protective means 12 forms a type of collar 29, which extends, at least in portions, inwardly into the container portion 2. This collar 29 effectively prevents water 8 from being able to slosh out of the opening 11 during transportation of the container unit 1.

In other advantageous configurations, the protective means 12 can also be provided on the container portion 2 and, in particular, be configured thereon.

Figure 5:
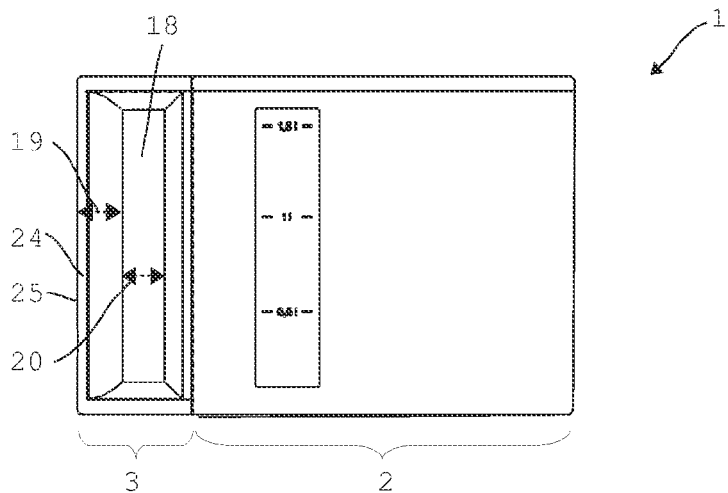
FIG. 5 is a purely schematic side view of a container unit.

So that a user can grasp the container unit 1 safely and conveniently, a special dimensioning of the holding portion 3 or the handle 25 is also provided. The special dimensioning will be described in more detail with the aid of FIGS. 5 and 6 below.

In this case, the width 17 of the handle 25 is between 30 and 50 mm, the depth 19 of the handle 25 making up between 60% and 75% of the width 17 of a handle 25, at least in portions. With a dimensioning of this type of the handle 25, the ratio between the width 17 and depth 19 of the handle 25 is advantageously selected in such a way that a user can hold the container unit 1 safely, reliably and also conveniently, despite the great height and depth of the container unit 1.

So that a user can also easily reach and clasp the handle 25, the aperture 18 between the container portion 2 and holding portion 3 has to have a corresponding size. In this case, the aperture 18 is advantageously configured in such a way that the depth of the aperture 20 is at least 20 mm, at least in the region of the handle 25. In the embodiment shown here, the depth of the aperture 20 has been adjusted to 27 mm, so even a user with relatively large hands can reach through the aperture 18 without problems and can clasp the handle 25.

Figure 6:
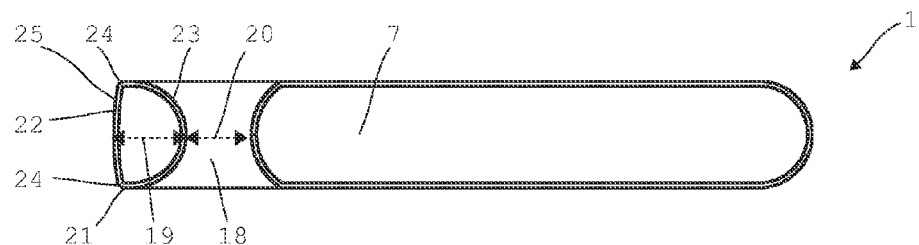
FIG. 6 is a purely schematic plan view of a container unit.

FIG. 6 purely schematically shows a sectional plan view of the container unit 1. It can be seen in this view that the holding portion 3 or the handle 25 has a rounded cross section 21. This is achieved in the embodiment shown in that the handle 25 is substantially curved on the front side 22 and on the rear side 23.

Particularly convenient clasping of the handle 25 is made possible by the over-archings on the front side 22 and on the rear side 23. So that the user can clasp the handle 25 particularly conveniently, the edges of the handle 25 are configured in such a way that the front side 22 and the rear side 23 adjoin one another in each case by way of at least one radius 24. This avoids the handle 25 having edges, which could cut into the hand of a user.

Owing to the general rounded configuration of the handle 5 and, in particular, also owing to the radii 24 between the front side 22 and the rear side 23, a particularly ergonomically shaped handle 25 is provided.

Figure 7:
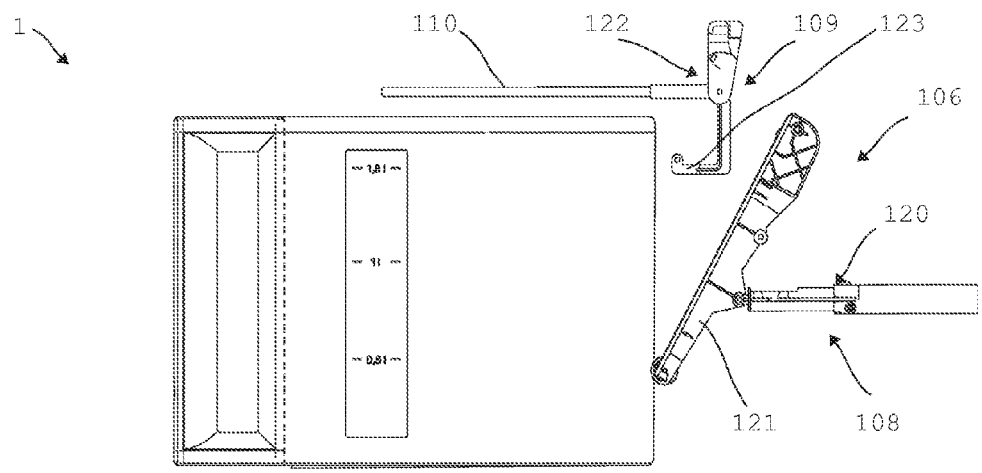
FIG. 7 is a purely schematic view of a container unit from the side in the receiving unit of a cooking appliance according to the invention before the removal of the container unit.
Figure 8:
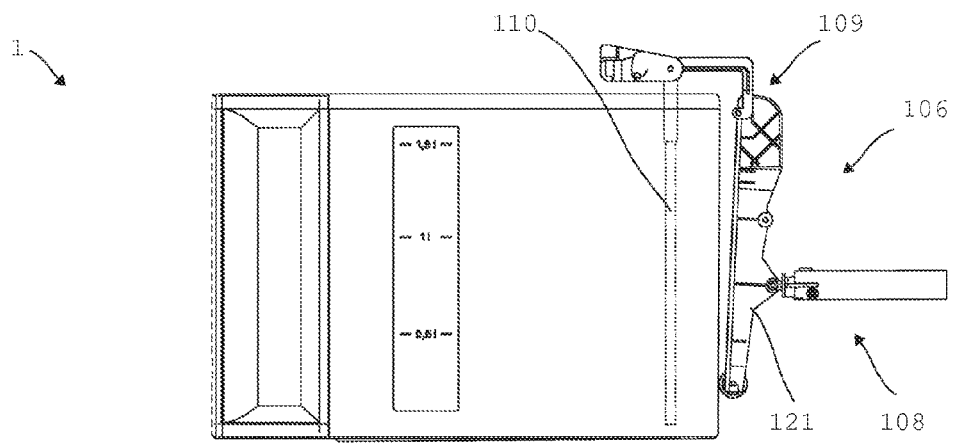
FIG. 8 is the view according to FIG. 7 in the operating position of the container unit.

FIGS. 7 and 8 show purely schematically that a push-to-open mechanism 108 is associated with the receiving unit 106 of the cooking appliance 100. The drawings show purely schematically a side view of the container unit 1 in the receiving unit 106.

In this case, the push-to-open mechanism 108 is configured in the receiving unit 106 in the embodiment shown here and assists the user when removing the container unit 1 from the cooking appliance 100. In other configurations, the push-to-open mechanism 108 may, however, also be provided on the container unit 1.

FIGS. 7 and 8 show purely schematically that a spring means 120 of the push-to-open mechanism 108 is preloaded when the container unit 1 is inserted into the receiving unit 106 and is kept in this preloading. In this situation, the container unit 1 is substantially completely inserted into the receiving unit 106 and, together with the front face 107 of the housing unit 101, forms a flush face.

In order to remove the container unit 1 from the receiving unit 106 again, the container unit 101 is pushed a small way into the receiving unit, so the push-to-open mechanism 108 is triggered and the stored spring force pushes a displacement element 121 forward. This displacement element 121 then pushes the container unit 1 so far out of the receiving unit 106 that a user can reach through the aperture 18 between the container portion 2 and holding portion 3 and can take hold of the handle 25. A suitable force point to trigger the push-to-open mechanism is indicated to the user by a marking 15 on the front 26 of the holding portion 3.

It can also be seen in FIGS. 7 and 8 that a removal device 109, by means of which water 8 can be removed from the receiving portion 2 and fed to the steam generation unit 103, is associated with the receiving unit 106.

In this case, the removal device 109 comprises a tube 110, which, when the container unit 1 is not inserted, is kept in an approximately horizontal position by a spring means 122. If the container unit 1 is inserted into the receiving unit 106, it comes into contact with the displacement element 121 of the push-to-open mechanism 108 and presses this displacement element 121 back. As a result, the spring means 120 of the push-to-open mechanism 108 is tensioned.

At the same time, the tube 110 is automatically immersed in the container portion 2 through the opening 11 in the cover 10 of the container unit 1. This takes place in that the container unit 1 presses against a leg 123 of the removal device 109 and therefore allows it to be immersed in the container portion 2 against the spring force of the spring means 122.

If the push-to-open mechanism 108 is unlocked again, the container unit 1 is pushed out of the receiving unit 106 by the spring force of the spring means 120. As a result, the tube 110 is automatically simultaneously pivoted away upwardly again by the spring means 122 of the removal device 109, so the container unit 1 can be removed from the cooking appliance 100 without problems.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 container unit
2 container portion
3 holding portion
4 longitudinal extent
5 width container portion
6 height container portion
7 capacity
8 water
9 longitudinal extent
10 cover
11 opening
12 protective device
13 wall
14 wall
15 marking
16 height holding portion
17 width handle
18 aperture
19 depth handle
20 depth aperture
21 cross section
22 front side
23 rear side
24 radius
25 handle
26 front
27 lid
28 slot
29 collar
100 cooking appliance
101 housing unit
102 cooking chamber
103 steam generation unit
104 steam
105 water storage means
106 receiving unit
107 front face
108 push-to-open mechanism
109 removal device
110 tube
111 cooking chamber door
112 combined cooking appliance
113 microwave unit
114 high-frequency generator
115 high-frequency radiation
116 inlet point
117 feed opening
118 steam inlet
119 steam outlet
120 spring means
121 displacement element
122 spring means
123 leg

What is claimed is:

1. A cooking appliance comprising:
at least one housing unit;
at least one cooking chamber;
at least one steam generation unit configured to supply the at least one cooking chamber with steam, the at least one steam generation unit including at least one removal device comprising at least one pivotable tube; and
at least one removable container unit that is associated with the at least one steam generation unit and comprises at least one container portion and at least one holding portion, the at least one container portion including at least one cover comprising a funnel-shaped protective device extending along a length of the cover and at least one opening disposed along the funnel-shaped protective device, the at least one opening including an elongate slot, a width of the elongate slot being larger than a width of a remainder of the opening, and a length of the elongate slot being less than a length of the remainder of the opening, wherein the at least one pivotable tube, at least in portions, is configured to be immersed in the at least one container portion through the elongate slot when the at least one removable container unit is inserted into a corresponding receiving unit next to the at least one cooking chamber, wherein the at least one container portion and the at least one holding portion together have a longitudinal extent that is a multiple of a width of the at least one container portion, wherein the at least the container portion has a height that is a multiple of the width of the at least one container portion, and wherein the at least one container portion is configured to provide a capacity for water to be evaporated that is at least 1 liter.

2. The cooking appliance of claim 1, wherein at least one of the longitudinal extent of the at least one container portion and of the at least one holding portion or the height of the at least one container portion is at least 4 times the width of the at least one container portion.

3. The cooking appliance of claim 1, wherein the longitudinal extent of the at least one container portion and of the at least one holding portion is greater than the height of the at least one container portion.

4. The cooking appliance of claim 1, wherein the capacity is at least 1.3 liters.

5. The cooking appliance of claim 1, wherein at least one of the height of the at least one container portion is between 15 cm and 25 cm or the longitudinal extent of the at least one container portion is between 20 cm and 30 cm or the longitudinal extent of the at least one container portion and of the at least one holding portion is between 25 cm and 35 cm.

6. The cooking appliance of claim 1, wherein the at least one cover extends over, at least partially, at least two walls of the at least one container portion.

7. The cooking appliance of claim 1, wherein the at least one holding portion comprises at least one operating marking.

8. The cooking appliance of claim 1, wherein the at least one removable container unit, in an installed state, terminates substantially flush with at least one front face of the at least one housing unit.

9. The cooking appliance of claim 1, wherein at least one push-to-open mechanism is associated with the corresponding receiving unit.

10. The cooking appliance of claim 1, wherein at least one microwave unit comprising at least one high-frequency generator is associated with the at least one cooking chamber.

11. The cooking appliance of claim 10, wherein the at least one high-frequency generator is configured to introduce high-frequency radiation into the at least one cooking chamber via at least one inlet point.

12. The cooking appliance of claim 1, wherein the at least one holding portion comprises a handle with a rounded cross section.

13. The cooking appliance of claim 12, wherein the rounded cross section is substantially curved on a front side of the rounded cross section and on a rear side of the rounded cross section.

14. The cooking appliance of claim 1, wherein the width of the at least one container portion is in a range of 3 to 5 cm, and wherein a width of the at least one holding portion is approximately the same as the width of the at least one container portion.

* * * * *